US009092203B2

(12) United States Patent
Park et al.

(10) Patent No.: US 9,092,203 B2
(45) Date of Patent: Jul. 28, 2015

(54) APPARATUS AND METHOD FOR RECOMMENDING SOFTWARE PROCESS IMPROVEMENT

(71) Applicant: SOGANG UNIVERSITY RESEARCH FOUNDATION, Seoul (KR)

(72) Inventors: Soo Yong Park, Seoul (KR); Su Jin Choi, Seoul (KR); Dae-Kyoo Kim, Gyeonggi-do (KR)

(73) Assignee: Sogang University Research Foundation, Seoul (KR)

( * ) Notice: Subject to any disclaimer, the term of this patent is extended or adjusted under 35 U.S.C. 154(b) by 0 days.

(21) Appl. No.: 13/906,008

(22) Filed: May 30, 2013

(65) Prior Publication Data

US 2014/0359553 A1 Dec. 4, 2014

(30) Foreign Application Priority Data

May 28, 2013 (KR) ........................ 10-2013-0060204

(51) Int. Cl.
*G06F 9/44* (2006.01)

(52) U.S. Cl.
CPC ........................................ *G06F 8/20* (2013.01)

(58) Field of Classification Search
CPC ................................................ G06F 8/20–8/40
USPC .................................................. 717/101–113
See application file for complete search history.

(56) References Cited

U.S. PATENT DOCUMENTS 7,035,809 B2 * 4/2006 Miller et al. ................. 705/7.23
8,418,123 B2 * 4/2013 Kamiyama et al. ........... 717/101
2003/0110067 A1 * 6/2003 Miller et al. ...................... 705/8
2004/0003369 A1 * 1/2004 Gonos ........................... 717/100
2004/0015377 A1 * 1/2004 Hostetler .......................... 705/7
2004/0093584 A1 * 5/2004 Le ................................. 717/103
2010/0162200 A1 * 6/2010 Kamiyama et al. ........... 717/101

OTHER PUBLICATIONS

SCAMPI Upgrade Team, Standard CMMI® Appraisal Method for Process Improvement (SCAMPISM) A, Version 1.3: Method Definition Document, Carnegie Mellon University Research Showcase @ CMU, Mar. 2011, pp. 1-266.*

Iversen, Jakob H., Lars Mathiassen, and Peter Axel Nielsen. “Managing risk in software process improvement: an action research approach.” Mis Quarterly (2004), pp. 395-433.*

Stelzer, Dirk, and Werner Mellis. “Success factors of organizational change in software process improvement.” Software Process: Improvement and Practice 4.4 (1998), pp. 227-250.*

Dyba, Tore. “An instrument for measuring the key factors of success in software process improvement.” Empirical software engineering 5.4 (2000), pp. 357-390.*

Humphrey, Watts S. “Introduction to software process improvement.” Carnegie Mellon University, (1993), pp. 1-32.*

Hanna Oktaba et al., Software Process Improvement: The Competisoft Project, 2007, IEEE, pp. 21-28.*

Ho-Won Jung, Evaluating the ordering of the Spice capability levels: an empirical study, 2004 Elsevier, pp. 141-149.*

* cited by examiner

*Primary Examiner* — Satish Rampuria
(74) *Attorney, Agent, or Firm* — Alston & Bird LLP

(57) ABSTRACT

An apparatus and method for recommending software process improvement are disclosed. The method includes generating improvement packages from correlated findings by analyzing correlations between findings identified from different processes, refining the improvement packages by performing an additional correlation analysis on the improvement packages, and providing an action plan for process improvement by building recommendations from the refined improvement packages.

13 Claims, 12 Drawing Sheets

FIG. 2

Correlation kinds
i: input
o: output
i/o: input-output
1: self

| Findings | | | Design | | Implementation | | | Testing | | Project Planning | | | M&A | Quality Assurance | |
|---|---|---|---|---|---|---|---|---|---|---|---|---|---|---|---|
| | | | S-DE-2 | W-DE-1 | S-IM-1 | W-IM-1 | W-IM-2 | W-TE-1 | W-TE-2 | W-PP-1 | W-PP-2 | W-PP-4 | S-MA-1 | W-QA-2 | W-QA-4 |
| Findings | Design | S-DE-2 | 1 | i/o | | i | | o | i/o | | o | | i | i/o | |
| | | W-DE-1 | i/o | 1 | | i | | i/o | | | | | i/o | | |
| | Implementation | S-IM-1 | | | 1 | | o | o | | | | | | i/o | |
| | | W-IM-1 | o | o | | 1 | | o | o | | | | | i/o | |
| | | W-IM-2 | | | i | | 1 | | | | | | | i/o | |
| | Testing | W-TE-1 | i | i/o | i | i | | 1 | | | | | | i/o | |
| | | W-TE-2 | i/o | | | i | | | 1 | | | | | | |
| | Project Planning | W-PP-1 | | | | | | | | 1 | | | i | | |
| | | W-PP-2 | i | | | | | | | | 1 | | | | i/o |
| | | W-PP-4 | | | | | | | | | | 1 | | | |
| | M&A | S-MA-1 | o | i/o | | | | | | o | | | 1 | | |
| | Quality Assurance | W-QA-2 | i/o | | i/o | i/o | i/o | i/o | | | | | | 1 | i |
| | | W-QA-4 | | | | | | | | | i/o | | | o | 1 |
| 'i' weight | | | 5 | 3 | 3 | 5 | 1 | 2 | 1 | - | 1 | - | 3 | 5 | 2 |
| 'o' weight | | | 5 | 4 | 1 | 1 | 2 | 5 | 2 | 1 | 2 | - | 1 | 6 | 1 |
| total weight | | | 8 | 5 | 4 | 6 | 3 | 6 | 3 | 2 | 3 | 1 | 4 | 7 | 3 |

M&A : Measurement & Analysis

FIG. 4A

*IP.S-DE-2 version 0.1*

| Finding | | Resource Types: Human Resources (HR) | Resource Types: Supporting tools (TL) | Resource Types: Other Resources | Comments on resources |
|---|---|---|---|---|---|
| Finding | S-DE-2 | | | | |
| | W-DE-1 | | | | |
| | S-IM-1 | | X | | Daily build tool [TL], SVN (configuration repository) [TL] |
| | W-IM-1 | | | | |
| | W-TE-1 | | | | |
| | W-TE-2 | | | | |
| | W-PP-2 | | | | |
| | S-MA-1 | | | | |
| | W-QA-2 | X | X | | Although QA team exists, human resources are not sufficient [HR]. Static analysis tool [TL], Performance testing tool [TL] |
| | W-IM-2 | | X | | Static analysis tool [TL] |
| | W-PP-1 | | | | |
| | W-PP-4 | | | | |
| | W-QA-4 | | X | | Project management system [TL] |

*added*

(a) Finding-to-Resource Analysis

FIG. 4B

*IP.S-DE-2 version 0.2*

| Finding | PM | Tester | Developer | Configuration manager | QA (Quality Assurance) |
|---|---|---|---|---|---|
| S-DE-2 | | X | X | | |
| W-DE-1 | | X | | | |
| S-IM-1 | | | X | X | |
| W-IM-1 | | X | X | | |
| W-TE-1 | | X | | | |
| W-TE-2 | | X | | | |
| W-PP-2 | X | | | | |
| S-MA-1 | X | X | X | | |
| W-QA-2 | | | | | X |
| W-IM-2 | | | X | | X |
| W-PP-1 | X | | | | |
| W-PP-4 | X | | | | |
| W-QA-4 | X | | | | X |

Roles

*added*

(b) Finding-to-Role analysis

FIG. 5

| | |
|---|---|
| **Recommendation ID** | **RECO01** |
| **Business Value** | **Very High** |
| **Base IP** | **IP.S-DE-2** |
| **Description** | **IMPROVE** testing process<br>**BY USING** testing strategy and test planning practice, and<br>**IMPROVING** test planning process and quality assurance process<br>**WITH** QA team and other automated tools<br>**IN** project planning phase<br>**TO ACHIEVE** system quality and time-to-market |

FIG. 6

| Finding ID | Finding Description | Recommendation Seed |
|---|---|---|
| S-DE-2 | In some projects, testing strategies and test plans are developed in consideration of project characteristics and customer needs in the design phase. | . Develop testing strategy in project planning in consideration of project characteristics and customer needs. |
| W-DE-1 | Test plans are not developed in most projects until later in the design phase. | . Develop test plan before detailed designing is started. |
| W-IM-1 | Test cases are developed, but testing techniques and test coverage criteria are not considered. | . Train project team members on testing techniques.<br>. Include testing techniques and test coverage criteria in test plan. |
| W-TE-1 | In some incremental development projects, regression test strategies and release criteria are not defined. | . Identify project characteristics including development life cycle and release criteria (per milestone)<br>. Establish regression testing strategy. |
| W-TE-2 | Test defects at several test levels are not properly collected and managed. | . Define applicable test levels.<br>. Establish test defect management plan. |
| S-MA-1 | Project specific metrics are defined to measure the process of development and testing in some projects. | . Define project specific test coverage criteria/metrics (example: number of interfaces to be tested). |
| W-PP-2 | The risk identification activity in the early project phase is not sufficiently practiced and the risk management process is not followed. | . Involve test manager in project risk identification meeting to consider testing perspectives in project planning phase. |
| W-QA-2 | Resources are not sufficient to support quality assurance activities such as static analysis, performance test, and process quality audit. | . Establish performance testing strategy.<br>. Expand static analysis practice. |

Evolved Recommendation Seed (Recommendation Item)

- Establish a testing strategy in consideration of project characteristics and customer needs in project planning [S-DE-2].
- * Project characteristics and customer needs include
  - development life cycle and release criteria [W-TE-1],
  - identified project risks [W-PP-2], and
  - performance testing needs [W-QA-2].
- * Testing strategy involves
  - regression testing strategy [W-TE-1],
  - applicable test levels [W-TE-2],
  - performance testing strategy [W-QA-2], and
  - . peer review strategy [W-IM-2].

*Subset of IP. IP.S-DE-2*

FIG. 7

| Concrete Recommendation | |
|---|---|
| **Perspectives** | **Recommendation Items** |
| *Recommendation Item in the previous figure*<br><br>**Software Life Cycle View** | **. Project Planning phase**<br>1) Establish testing strategy in consideration of project characteristics and customer needs such as project risks, development life cycle, release criteria, and performance testing needs [S-DE-2, W-PP-2, W-TE-1, W-QA-2].<br>2) Establish testing strategy in project planning [S-DE-2].<br>* Test strategy may include regression test strategy [W-TE-1], applicable test levels [W-TE-2], performance testing strategy [W-QA-2], and peer review strategy [W-IM-2].<br>3) Plan training on testing (e.g., test design) for project team members.<br>4) Conduct formal QA review for the established testing strategy [W-QA-2, W-ORG-2].<br>**. Design phase**<br>1) Establish test plan before detailed designing is started [S-DE-2, W-DE-1, V-BIS-2].<br>* Test plan includes defect management plan [W-TE-2], project specific test coverage criteria and metrics (e.g., number of interfaces to be tested) [S-MA-1], and peer review plan (example criteria: focus peer review activity for defect-prone or changed codes) [W-IM-2]<br>2) Conduct formal QA review activity for the established test plan [W-QA-2, W-ORG-2].<br>**. Testing Phase**<br>1) Review progress of testing using defined test coverage criteria and metrics [W-IM-1, W-TE-1].<br>**. Deployment phase**<br>1) Before product release, conduct formal review to ensure the test coverage is satisfied [W-IM-1, W-TE-1, W-ORG-2, V-SLC-1].<br>**. Project Closure phase**<br>1) Collect the lessons learned and good practices of the project and store them for reference in other projects [V-SLC-1]. |
| **Organizational View** | **. Tools and Systems**<br>1) Integrate static analysis tool with auto-build system for frequent analysis with less effort [S-IM-1, W-IM-2, W-QA-2, V-ORG-1].<br>2) Introduce new system or improve the existing PMS system for defect management and QA audit result management [V-ORG-1].<br>**. Human resources**<br>1) Assign QA personnel responsible for supporting testing activities [V-ORG-2, V-ORG-3]<br>**. Role**<br>1) Designate test manager during project planning phase and have test manager participate in project planning such as risk identification and development life cycle selection [W-PP-2].<br>2) Have QA provide guidance on establishing testing strategy and test plan of each project and conduct formal milestone review on testing activity against established testing coverage criteria and metrics [V-ORG-2, V-ORG-3]. |
| **Assessment Model View** | None |
| **Business Value View** | 1) Establish risk identification checklist using historical risk data and encourage to use the checklist for project planning [V-BIS-3].<br>2) Provide guidelines and training for regression testing [V-BIS-2] |
| **Others** | 1) Improve training program on testing by referencing current good practices of projects [W-IM-1, W-TE-2, W-IM-2, V-BIS-3].<br>* training topics include 'test planning' for project managers and test managers and 'testing techniques' for test managers and developers. |
| **Suggested Team Composition** | |
| Include tester, project manager, and QA in the process action team | |

* RMR : Reference Model Relation

* IPR : Improvement Package Relation

RW : Relation Weight

RW : Relation Weight

APPARATUS AND METHOD FOR RECOMMENDING SOFTWARE PROCESS IMPROVEMENT

BACKGROUND OF THE INVENTION

1. Field of the Invention

The present invention relates to a technique of recommending software process improvement, and more particularly, to an apparatus and method for receiving process assessment results, analyzing correlations between findings, and providing recommendations for software process improvement, and a recording medium for recording the method.

2. Description of the Related Art

Many software organizations perform Software Process Improvement (SPI) activities in order to achieve business objectives. SPI activities are performed typically in a cycle of current level assessment, improvement planning, improvement plan implementation, and monitoring. The current level assessment is an activity of understanding the difference between a software process implementation level of a software organization and a process reference model. Major software process reference models include the Capability Maturity Model Integration (CMMI) of the Software Engineering Institute (SEI) in the U.S, International Organization for Standardization/International Electrotechnical Commission (ISO/IEC) 15504 (also known as Software Process Improvement Capability Determination (SPICE)), and the Korean Software Process Certification Reference (also known as K-model). A process improvement plan is built based on the results of the current level assessment and a process is deployed and internalized by conducting the improvement plan and monitoring the plan conduction. The process improvement activities continue by repeating the process improvement cycle of assessment, planning, and plan conduction.

For continuous SPI, many companies periodically implement process assessment and thus plan process improvement. A process reassessment rate is increasing progressively. In this context, the importance of the quality of process improvement planning for successful SPI activities cannot be too much emphasized.

While process reference models and assessment methods have been actively standardized and studied and thus practice cases have been accumulated, studies are yet to be made on a systematic method for planning process improvement based on process assessment results and process planning is dominantly dependent on a process expert in the SPI field.

The following prior art documents include a process assessment method and a process improvement cycle guideline for a CMMI reference model. However, the prior art documents do not provide a technical means of systematically defining process improvement recommendations, taking into account strengths determined from software process assessment.

PRIOR ART DOCUMENTS (Non-patent document 1) SCAMPI Upgrade Team. Standard CMMI assessment method for process improvement (SCAMPI) A, version 1.3: Method definition document. Technical Report CMU/SEI-2011-HB-001, Software Engineering Inst., Carnegie Mellon University, 2011.

(Non-patent document 2) Bob McFeeley. IDEAL: A user's guide for software process improvement. Technical Report CMU/SEI-96-HB-001, Software Engineering Inst., Carnegie Mellon University, 1996.

SUMMARY OF THE INVENTION

The present invention is directed to an apparatus and method for recommending software process improvement that substantially obviate one or more problems due to limitations and disadvantages of the related art. An object of the present invention is to solve a problem that planning process improvement relies on an individual's capability due to the absence of a structured technical means of defining process improvement recommendations based on strengths derived from software process assessment and thus it is difficult to predict the quality of results, and to overcome a limitation that process improvement may be planned by emphasizing the weaknesses of an organization without making use of the strengths of the organization.

In an aspect of the present invention, a method for recommending software process improvement using at least one processor includes generating improvement packages from correlated findings by analyzing correlations between findings identified from different processes, refining the improvement packages by performing an additional correlation analysis on the improvement packages from at least one of an organizational view, a software life cycle view, an assessment model view, and a business value view, and providing an action plan for process improvement by building recommendations from the refined improvement packages.

The generation of the improvement packages may include receiving findings identified by process assessment, calculating correlation weights for the findings by determining input and output between the findings using a symmetrical matrix having the findings in rows and columns, and grouping a predetermined number of findings into the improvement packages in a descending order of the correlation weights. The grouping may include grouping the identified correlated findings to include many findings and many process areas in each of the improvement packages and to minimize redundancy between the improvement packages.

The provision of the action plan may include identifying an abstract recommendation by receiving abstract information about each of the improvement packages according to predetermined recommendation templates, and building a concrete recommendation by identifying recommendation seeds from findings of an improvement package regarding the identified abstract recommendation.

In another aspect of the present invention, there is provided a computer-readable recording medium to which a program for performing the recommendation method in a computer is written.

In another aspect of the present invention, an apparatus for recommending software process improvement includes an input unit configured to receive findings identified from different processes by process assessment, and a processing unit configured to include at least one processor, to generate improvement packages from correlated findings by analyzing correlations between the received findings, to refine the improvement packages by performing an additional correlation analysis on the improvement packages from at least one of an organizational view, a software life cycle view, an assessment model view, and a business value view, and to provide an action plan for process improvement by building recommendations from the refined improvement packages.

The apparatus may further include a model storage configured to store process correlations provided by a reference model and a process correlation model generated based on correlation data empirically collected during a software process improvement procedure. The processing unit may analyze the correlations between the findings by determining input and output between the received findings, referring to the stored process correlation model.

The process correlation model may be generated based on a first graph and a second graph, the first graph including a Process Model Relation (PMR) representing a correlation weight between practices to which findings are mapped in the reference model, and the second graph including an Improvement Package Relation (IPR) representing a weight assigned to the number of occurrences of a relation between practices in empirically collected project cases, and a Relation Weight (RW) of the process correlation model may be calculated by adding the PMR to the IPR.

The processing unit may group the identified correlated findings referring to the process correlation model in a manner that maximizes a correlation weight between findings, maximizes the number of findings in one improvement package, and minimizes redundancy between improvement packages.

The processing unit may calculate the correlation weights by determining input and output between the findings using a symmetrical matrix having the received findings in rows and columns, and may generate the improvement packages by grouping a predetermined number of findings into the improvement packages in a descending order of the correlation weights.

The processing unit may amend the improvement packages or findings of the improvement packages by performing an additional correlation analysis on the improvement packages from at least one of an organizational view, a software life cycle view, an assessment model view, and a business value view.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates an exemplary finding correlation matrix in a method for recommending software process improvement according to an embodiment of the present invention;

FIGS. 4A and 4B illustrate exemplary finding-organizational view matrices for use in refining improvement packages in a method for recommending software process improvement according to an embodiment of the present invention;

FIG. 5 illustrates a detailed recommendation for use in generating improvement recommendations in a method for recommending software process improvement according to an embodiment of the present invention;

FIG. 6 illustrates an exemplary operation of identifying recommendation seeds;

FIG. 7 illustrates an exemplary concrete recommendation built by a grouping operation of FIG. 6;

DETAILED DESCRIPTION OF THE INVENTION

Figure 1:
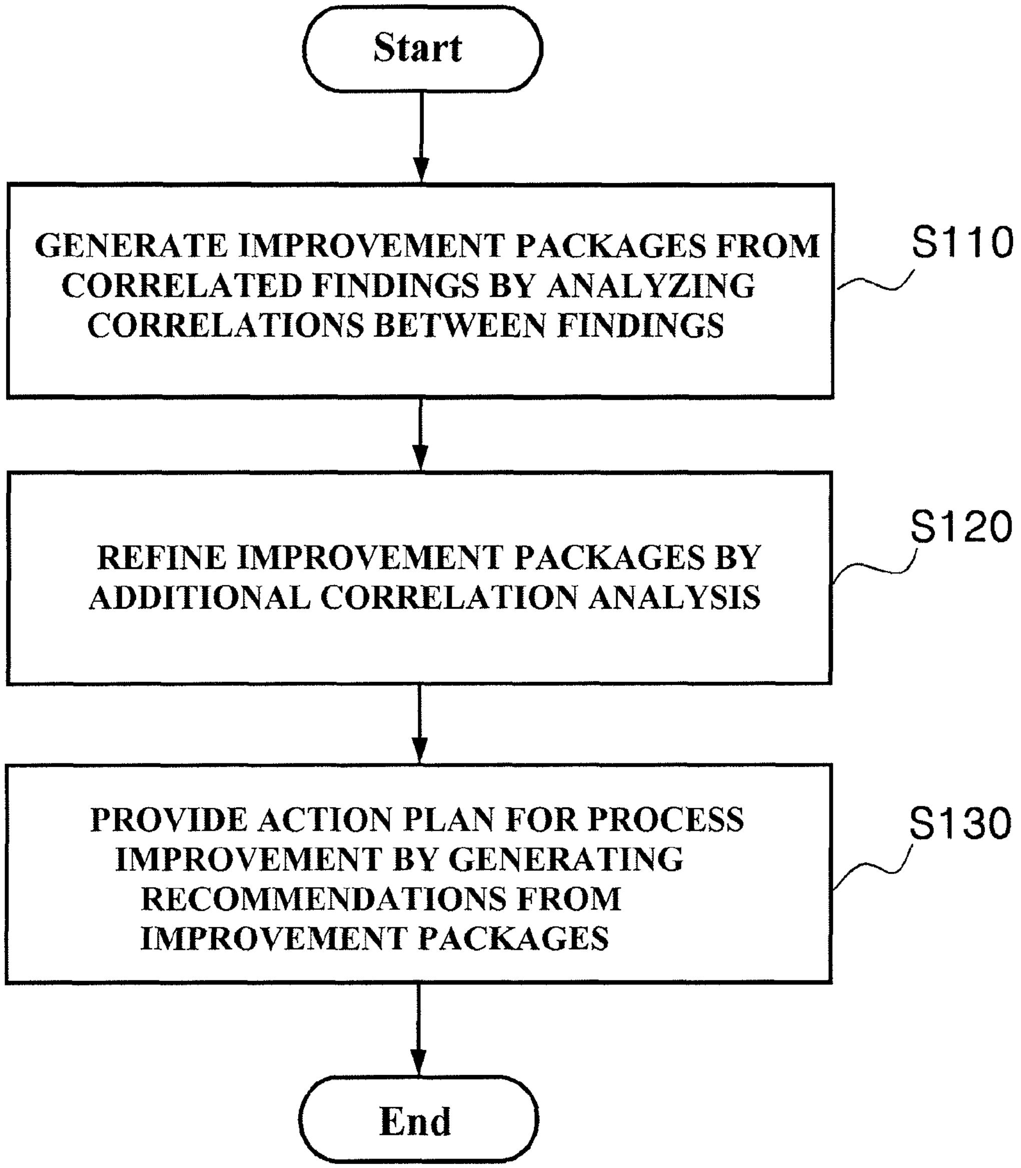
FIG. 1 is a flowchart illustrating a method for recommending software process improvement according to an embodiment of the present invention.

Reference will now be made in detail to the preferred embodiments of the present invention, examples of which are illustrated in the accompanying drawings. Wherever possible, the same reference numerals will be used throughout the drawings to refer to the same or like parts.

Before describing embodiments of the present invention, Software Process Improvement (SPI) studies and their problems are first described, and then technical means adopted in the embodiments of the present invention to solve the problems are sequentially provided.

SPI is planned based on the results of software process assessment. Process assessment aims to identify the strengths and weaknesses of a software organization and provide improvement recommendations for improvement planning based on the strengths and weaknesses. The improvement recommendations determined from the assessment results are a core factor corresponding to "what to improve" in an improvement plan. If an assessment team does not provide appropriate improvement recommendations, the quality of an improvement plan is adversely affected.

Process assessment is performed generally according to an assessment method provided along with a process reference model. A representative assessment methodology is a Standard CMMI Assessment Method for Process Improvement (SCAMPI) for a Capability Maturity Model Integration (CMMI) reference model.

This methodology focuses on discovery of the strengths and weaknesses of an organization software process, without regarding improvement recommendations as an essential achievement resulting from process assessment. Accordingly, the method does not deal with a method of defining improvement recommendations based on strengths and weaknesses. While a process improvement cycle guideline such as IDEAL handles important roles and activities related to current level assessment, improvement planning, plan implementation, and monitoring, it simply addresses practice of an idea meeting between an assessment team and associated members of a targeted organization, regarding improvement recommendations, without suggesting a specific improvement recommendation method. This means that process planning may rely on process experts alone and it is difficult to predict an implementation procedure or the quality of a created plan.

Moreover, current present process assessment methodologies and process improvement cycle guidelines focus on identifying weaknesses rather than strengths. Even though the strengths are identified, there is no specific commitment as to how the strengths are used in a subsequent improvement process. As a consequence, areas to which the strengths may contribute in process improvement planning and plan implementation are limited.

A software process reference model includes several to several tens of correlated processes (e.g. the CMMI includes 22 correlated processes, the SPICE includes 48 correlated processes, and the K-model includes 17 correlated processes). Although strengths and weaknesses are identified on a process basis, an improvement plan needs to be built towards synergy maximization, taking into account correlations between processes. However, the absence of a specific improvement recommendation development procedure makes it difficult to make improvement recommendations in consideration of correlations between processes, which may cause a risk of fragmentary identification of actions to be taken from individual weaknesses after the assessment in a process improvement field.

That is, if a systematic procedure of defining process improvement recommendations from strengths and weaknesses derived from software process assessment is not provided, process improvement planning relies on an individual's capability. As a result, it is difficult to predict the quality of the result, a process improvement plan that focuses only on the weaknesses without making use of the strengths of an organization may be built, and it is difficult to plan process improvement in consideration of correlations between processes and synergy.

Thus, embodiments of the present invention provide an improvement recommendation model for SPI in order to solve the above-described problems. The embodiments of the present invention provide specific procedures and technical means of receiving strengths and weaknesses resulting from process assessment and outputting improvement recommendations. These specific procedures and technical means are provided specifically by considering strengths, analyzing findings based on correlations between processes, analyzing the findings in consideration of the characteristics of a targeted organization (business objectives, a development life cycle, human/material resources, a selected process assessment model, etc.), and providing integrated improvement recommendations based on analysis results. In addition, the embodiments of the present invention provide an automation tool for enhancing the applicability of a process improvement recommendation model to an actual field.

Terms used in the embodiments of the present invention are defined as follows.

Software Process Improvement (SPI): an activity of improving software quality by software process improvement based on the premise that 'system quality depends on the quality of processes for acquiring, developing, maintaining, and repairing a system'.

Finding: a strength or a weakness discovered by process assessment.

Strength: a good practice implemented beyond the requirements of a reference model.

Weakness: a practice that does not satisfy the requirements of the reference model or that is not efficient.

Improvement package: a collection of correlated findings, which is an improvement recommendation development unit.

Recommendation: a process improvement recommendation aimed to overcome weaknesses or spread strengths.

A detailed description will now be given of embodiments of the present invention with reference to the accompanying drawings.

FIG. 1 is a flowchart illustrating a method for recommending software process improvement according to an embodiment of the present invention. The method of FIG. 1 may be performed in an SPI recommendation system. This SPI recommendation system includes at least one processor as a physical hardware device. When needed, the SPI recommendation system may use a memory and a storage as resources needed for computations.

Referring to FIG. 1, the SPI recommendation system generates improvement packages from correlated findings by analyzing correlations between findings identified from different processes in step S110. Both strengths and weaknesses discovered by process assessment are used as input values in the correlation analysis operation.

In step S120, the SPI recommendation system refines the improvement packages by performing an additional correlation analysis on the improvement packages generated in step S110 from at least one of an organizational view, a software life cycle view, an assessment model view, and a business value view.

In step S130, the SPI recommendation system provides an action plan for process improvement by generating recommendations from the improvement packages refined in step S120. The recommendations are processed in two stages: a higher level abstract recommendation is identified and then specified into a concrete recommendation.

Hereinbelow, each operation will be described in greater detail.

(1) Correlation Analysis

Associated findings resulting from process assessment are bound into one improvement recommendation package by correlation analysis. The correlation analysis may involve two activities: an activity of analyzing finding correlations and an activity of identifying improvement packages.

In the finding correlation analysis activity, correlated findings are identified using a symmetrical finding-finding matrix. For example, the improvement packages may be generated by receiving the findings identified by process assessment, calculating correlation weights for the findings by determining input/output between the findings using a symmetrical matrix with the findings in rows and columns, and grouping a predetermined number of findings into the improvement packages in a descending order of the correlation weights.

FIG. 2 illustrates an exemplary finding correlation matrix in the method for recommending software process improvement according to the embodiment of the present invention. All other findings are examined in terms of correlations, for each finding.

A correlation between findings is identified based on correlations between findings provided by a reference model because individual findings are identified for a specific process of the reference model in process assessment.

Figure 3:
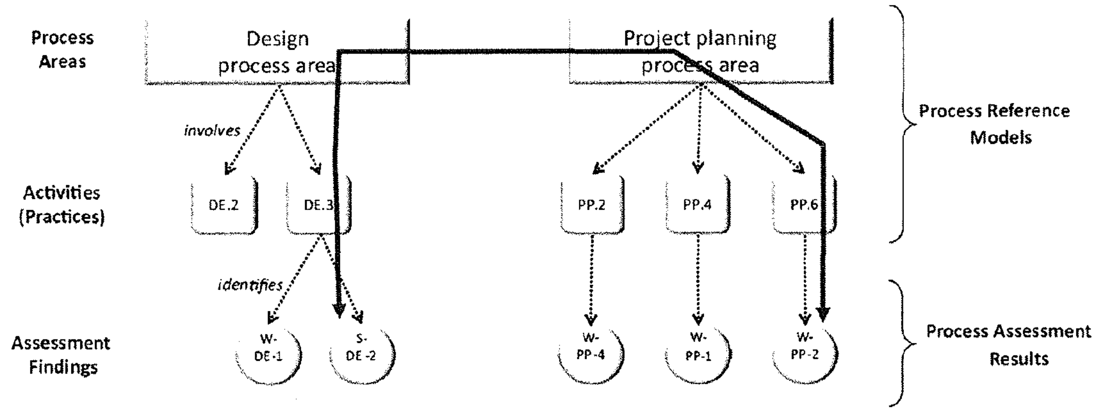
FIG. 3 illustrates an operation of deriving correlations between findings using the correlation matrix illustrated in FIG. 2.

Relations between reference models and findings may be represented as illustrated in FIG. 3. FIG. 3 illustrates an operation of determining correlations between findings using the correlation matrix of FIG. 2.

In the improvement package identifying activity, improvement packages, each including correlated findings identified in the previous activity, are identified. Preferably, the improvement packages are identified by grouping the findings in such a manner that many findings and many process areas are included in the improvement packages and redundancy between the improvement packages is minimized. Highly similar improvement packages are examined and integrated into one improvement package. Thus, tens of findings are grouped typically into a few improvement packages.

(2) Refining Improvement Packages

The improvement packages identified by the forgoing correlation analysis operation are refined by an additional correlation analysis. In embodiments of the present invention, four views are considered: an organizational view, a software life cycle view, an assessment model view, and a business value view.

Regarding the organizational view, the improvement packages are analyzed from the viewpoint of correlations with resources preserved in the organization. That is, different findings using the same resources are identified as correlated. If the additional correlation analysis is performed from the organizational view, correlations between the resources of the organization that performs SPI and the findings are calculated using a matrix having the resources in rows and the findings in columns, and thus the improvement packages or the findings of the improvement packages may be amended in the improvement package refinement operation.

Regarding the software life cycle view, the improvement packages are analyzed from the viewpoint of temporal correlations on software life cycles. If the additional correlation analysis is performed from the software life cycle view, correlations between the life cycles and the findings are calculated using a matrix having the life cycles in rows and the findings in columns, taking into account temporal correlations on the software life cycles and thus the improvement packages or the findings of the improvement packages may be amended in the improvement package refinement operation.

Regarding the assessment model view, the improvement packages are examined from the viewpoint of the limitations of process assessment models used in the organization. If the additional correlation analysis is performed from the assessment model view, correlations between the process assessment models and the findings are calculated using a matrix having the process assessment models in rows and the findings in columns, taking into account the limitations of the process assessment models used in the organization and thus the improvement packages or the findings of the improvement packages may be amended in the improvement package refinement operation.

Regarding the business value view, the improvement packages are prioritized according to their business priority levels. If the additional correlation analysis is performed from the business value view, correlations between the business priority levels and the findings are calculated using a matrix having the business priority levels in rows and the findings in columns to prioritize the improvement packages according to the business priority levels, and thus the improvement packages or the findings of the improvement packages may be amended in the improvement package refinement operation.

In each refinement step, a finding may be removed from an improvement package or added to the improvement package, the improvement package may be separated into two or more improvement packages, or similar improvement packages may be integrated into one improvement package.

FIGS. 4A and 4B illustrate exemplary finding-organizational view matrices for use in refining improvement packages in the method for recommending software process improvement according to the embodiment of the present invention. Referring to FIGS. 4A and 4B, when a process-view correlation is absent but an organizational-view correlation is identified in a finding, the finding is added to an improvement package.

(3) Building Recommendations

Recommendations are built based on the improvement packages refined in the foregoing improvement package refinement operation. The recommendation building operation may involve two activities, i.e. an abstract recommendation defining activity and a concrete recommendation building activity.

In the abstract recommendation defining activity, the improvement intention and method of each improvement package is represented according to abstract recommendation description templates illustrated in Table 1. That is, an abstract recommendation is identified by receiving abstract information about each of the improvement packages from a user according to pre-stored abstract recommendation description templates.

TABLE 1

| Type | Findings | Description Template |
|---|---|---|
| W-S | Strengths, Weaknesses | IMPROVE <weakness>* BY [ [USING <strength>* ], [IMPROVING <weakness>* ] ] WITH <resource>* IN <life cycle phase>* TO ACHIEVE <business objective>* |
| W-W | Weaknesses only | IMPROVE <weakness>* BY IMPROVING <weakness>* WITH <resource>* IN <life cycle phase>* TO ACHIEVE <business objective>* |
| S-S | Strengths only | ENHANCE <strength>* BY USING <strength>* WITH <resource>* IN <life cycle phase>* TO ACHIEVE <business objective>* |
| S-W | Strengths, Weaknesses | ENHANCE <strength>* BY [ [USING <strength>*], [IMPROVING <weakness>*] ] WITH <resource>* IN <life cycle phase>* TO ACHIEVE <business objective>* |

In addition, an abstraction recommendation is represented by abstracting what (an IMPROVE phrase), how (a BY phrase), in what resources (a WITH phrase), when (an IN phrase), and why (a TO ACHIEVE phrase), as illustrated in FIG. 5. FIG. 5 illustrates a detailed recommendation for use in building recommendations in the method for recommending software process improvement according to the embodiment of the present invention.

In the concrete recommendation building activity, an abstract recommendation of an improvement package is specified into a concrete recommendation. The concrete recommendation is built by identifying recommendation seeds from the findings of the improvement package regarding the afore-identified abstract recommendation. The recommendation seeds are identified in such a manner that strengths are spread across the organization and weaknesses are overcome or alternatives are suggested. As correlated recommendation seeds are grouped as illustrated in FIG. 6 and additional recommendation items are identified based on the grouping, the concrete recommendation is completed. FIG. 6 illustrates an exemplary operation of identifying recommendation seeds. Recommendations are developed from findings identified from different processes so as to create mutual synergy by this operation. FIG. 7 illustrates a concrete recommendation that has been completed by the grouping operation of FIG. 6.

Figure 8:
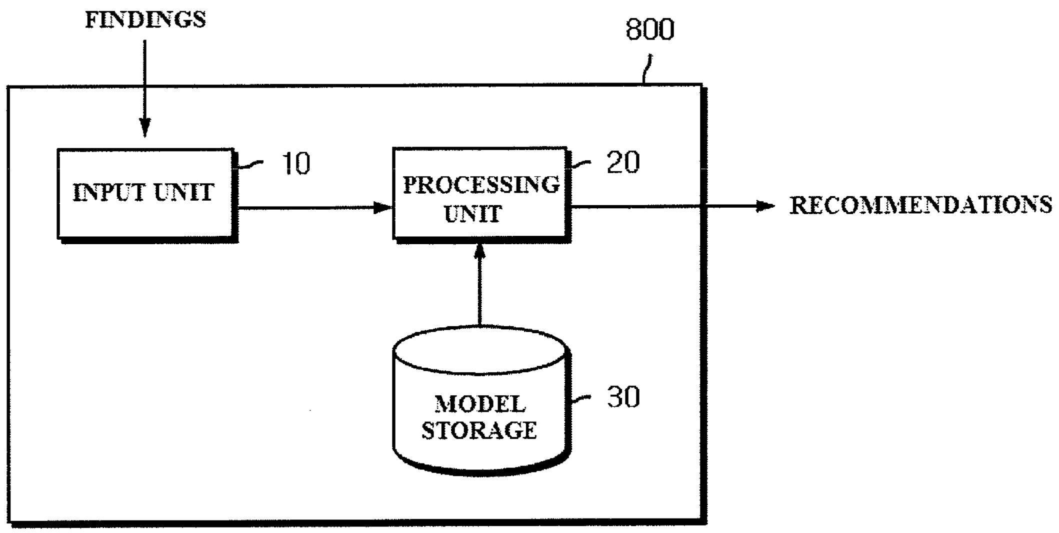
FIG. 8 is a block diagram of an apparatus for recommending software process improvement according to an embodiment of the present invention.

FIG. 8 is a block diagram of an SPI recommendation apparatus 800 according to an embodiment of the present invention. The SPI recommendation apparatus 800 is reconfigured mainly with automated hardware components that implement the afore-described embodiments of the present invention. Therefore, a brief description will be given of the function of the SPI recommendation apparatus 800 in terms of a physical configuration to avoid repeated explanations.

The SPI recommendation apparatus 800 essentially includes an input unit 10 and a processing unit 20. Preferably, the SPI recommendation apparatus 800 further includes a model storage 30.

The input unit 10 receives findings identified from different processes by process assessment.

The processing unit 20 includes at least one processor and generates improvement packages from correlated findings by analyzing correlations between the correlated findings, refines the improvement packages, and provides an action plan for process improvement by building recommendations from the refined improvement packages. This processing unit 20 may include logically separate processing modules that operate on a function basis.

The processing unit 20 may calculate correlation weights for the input findings by determining input and output between the findings using a symmetrical matrix with the findings in rows and columns and generate improvement packages by grouping the findings into the improvement packages in a descending order of the correlation weights. In addition, the processing unit 20 may amend the improvement packages or the findings of the improvement packages by additionally analyzing correlations from at least one of an organizational view, a software life cycle view, an assessment model view, and a business value view.

Figure 9:
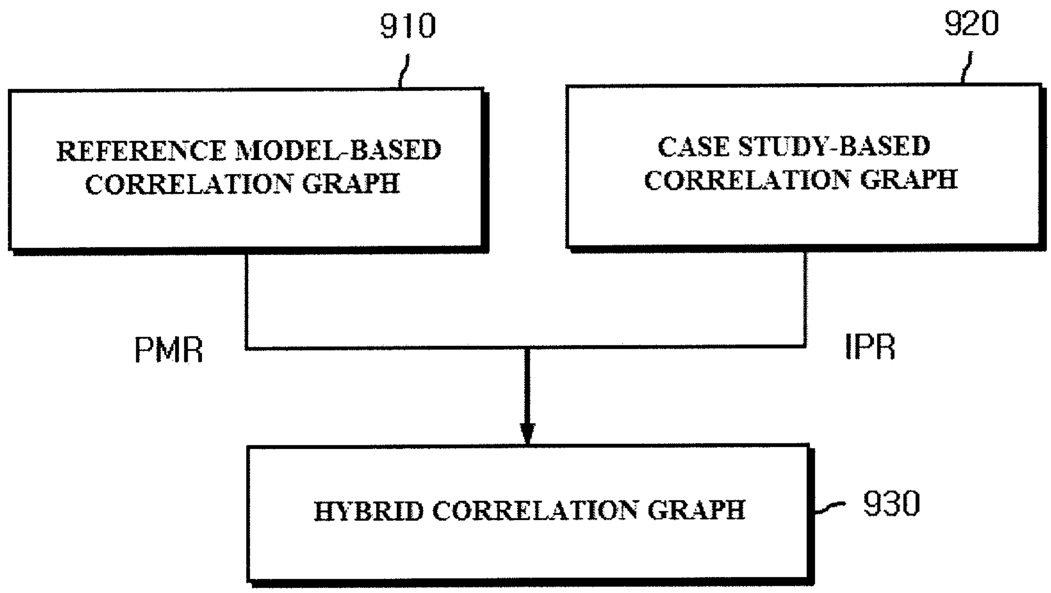
FIG. 9 illustrates an operation of generating a correlation model in the apparatus for recommending software process improvement illustrated in FIG. 8.

Embodiments of the present invention provide a hybrid correlation model using empirically analyzed correlation data in an improvement project based on process correlations provided by a reference model and an improvement project based on an actual case study according to the structure illustrated in FIG. 9.

Referring to FIG. 9, a hybrid correlation graph 930 may be derived by combining a reference model-based correlation graph 910 with a case study-based correlation graph 920. The graphs 910 and 920 generate two values as correlation weights, i.e. a Process Model Relation (PMR) and an Improvement Package Relation (IPR), and a Relation Weight (RW) of the hybrid correlation graph 930 is determined based on the PMR and IPR.

For this purpose, the SPI recommendation apparatus 800 of FIG. 8 may further include the model storage 30. The model storage 30 is configured so as to store a process correlation model that has been generated based on process correlations provided by the reference model and correlation data empirically collected during an SPI procedure. The processing unit 20 may analyze correlations between the findings by determining input and output between the findings, referring to the process correlation model stored in the model storage 30.

Figure 10A:
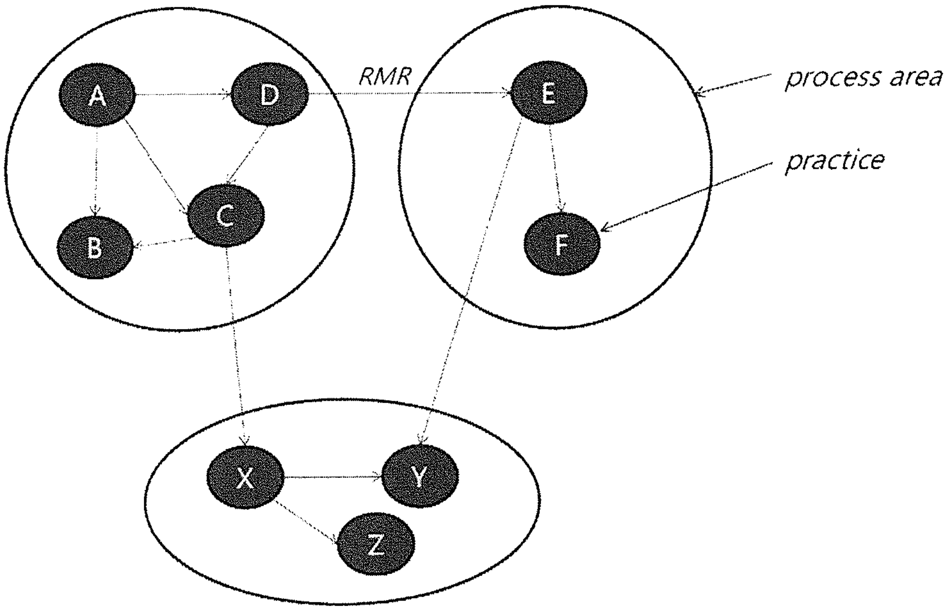
FIGS. 10A and 10B illustrate operations of generating process correlation graphs based on a reference model and a case study, respectively.

FIG. 10A illustrates an operation of generating a process correlation graph based on a reference model. Specifically, FIG. 10A graphically represents relations between practices in the process reference model. Each node represents an individual practice in the reference model, and an edge indicates that two practices are related. The edge may be extracted through a flow of work products between the two practices. A PMR represents a correlation weight between practices in the process reference model and assigns a weight to the relation between practices of different processes.

Figure 10B:
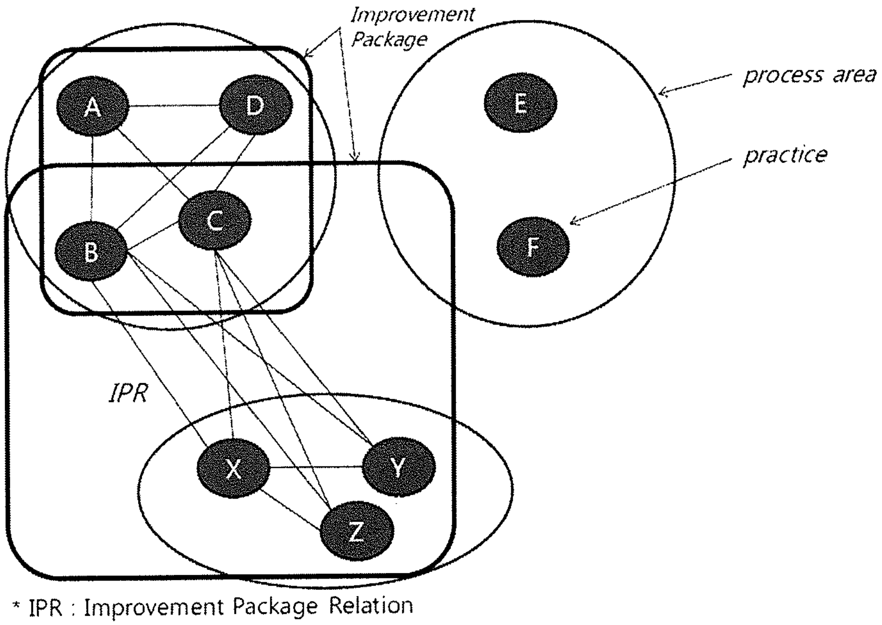

FIG. 10B illustrates an operation of generating a case study-based process correlation graph. Specifically, FIG. 10B graphically represents relations between practices based on improvement packages derived by the SPI recommendation apparatus according to the embodiment of the present invention. An IPR is a weight assigned according to the number of occurrences of a corresponding relation among total project cases. If two practices are bound into the same improvement package repeatedly in a plurality of project cases, a higher weight is set for the relation between the two practices.

Figure 11:
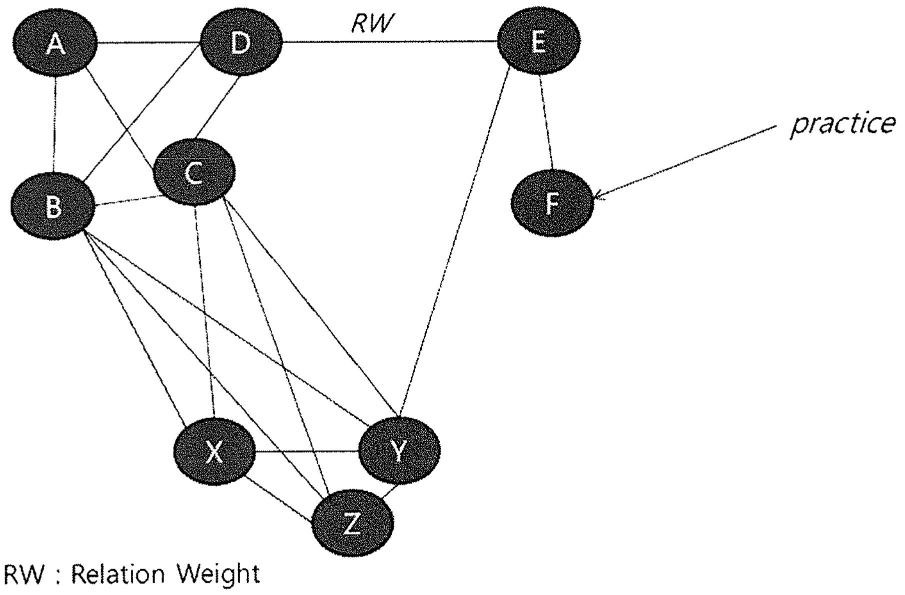
FIG. 11 illustrates an exemplary final hybrid process correlation model generated using the correlation graphs illustrated in FIGS. 10A and 10B.

FIG. 11 illustrates an exemplary final hybrid process correlation mode generated based on the correlation graphs illustrated in FIGS. 10A and 10B. An RW is calculated by adding an IPR and a PMR illustrated in FIGS. 10A and 10B.

Figure 12A:
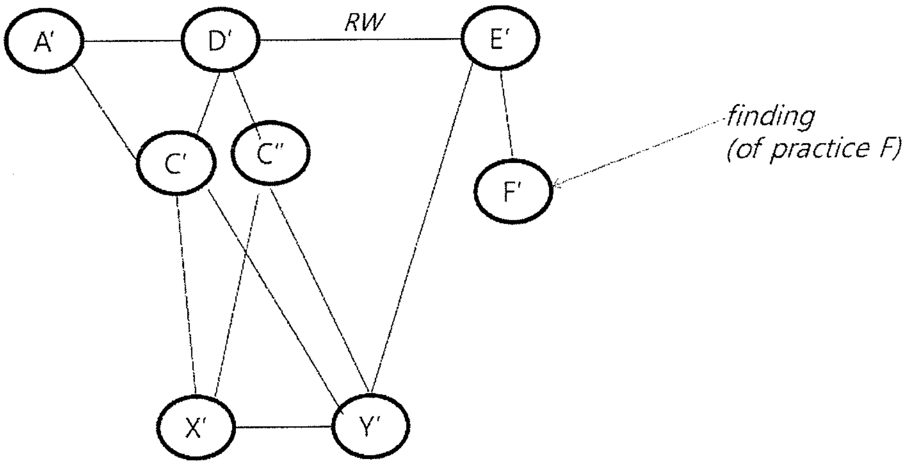
FIGS. 12A and 12B illustrate operations of suggesting improvement packages using the hybrid process correlation model illustrated in FIG. 11.
Figure 12B:
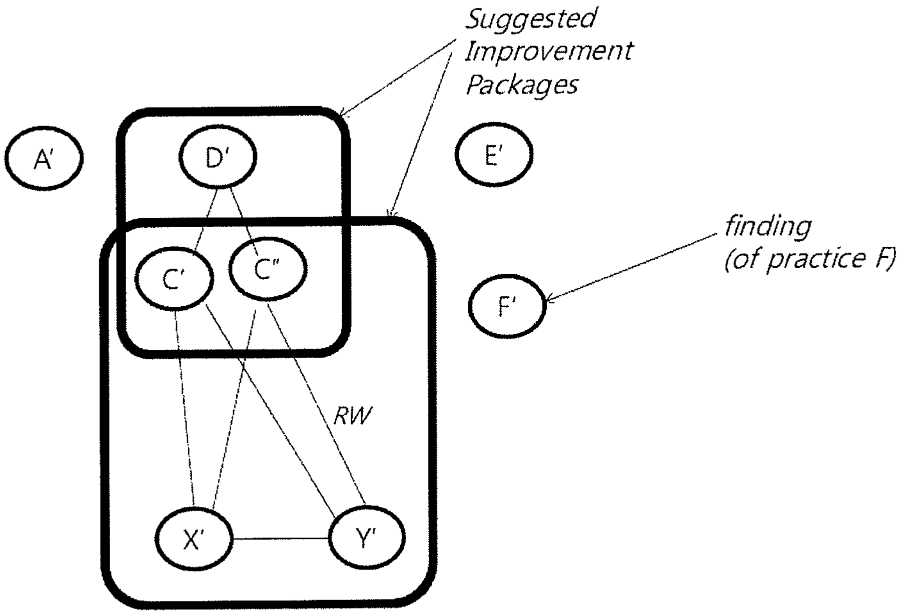

FIGS. 12A and 12B illustrate operations of suggesting improvement packages using the hybrid process correlation model of FIG. 11. The improvement packages are suggested by applying the hybrid process correlation model to assessment findings.

First of all, the relations between findings of a targeted organization are represented as a graph based on the hybrid process correlation model, as illustrated in FIG. 12A. The graph may be drawn by mapping each finding to a connected practice. In FIG. 12A, a finding F' is mapped to a practice F in FIGS. 10A and 10B. A correlation weight between two findings is determined according to a correlation weight between two findings in the hybrid process correlation model.

Then, improvement packages are suggested based on relation weights as illustrated in FIG. 12B. Preferably, the improvement packages are provided by generating a set of findings in such a manner that relation weights between findings are high, many findings are included in one improvement package, and redundancy between improvement packages is low.

In summary, a process correlation model is generated based on a first graph including Process Model Relations (PMRs) that represent the correlation weights between practices to which findings are mapped and a second graph including Improvement Package Relations (IPRs) that represent weights assigned according to the number of occurrences of relations between practices in empirically collected project cases. Relation Weights (RWs) of the process correlation model are calculated by adding the PMRs to the IPMs. Preferably, the correlated findings are grouped referring to the process correlation model in a manner that maximizes a correlation weight between findings, maximizes the number of findings in one improvement package, and minimizes redundancy between improvement packages.

According to the embodiments of the present invention, a systematic, structured improvement plan can be built using a quantitative technical means. In addition, since even an inexperienced user can examine considerations for software process improvement without omission and understand the impact of each practice on other practices by correlation analysis, he/she can present the need for specific improvements and can provide recommendations suitable for the characteristics of a targeted organization. In contrast, conventional SPI methodologies rely on individuals' capabilities.

Embodiments of the present invention may be implemented as code that can be written on a computer-readable recording medium and thus read by a computer. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments to realize the embodiments herein can be easily understood by one of ordinary skill in the art.

The present invention has been described herein with reference to the foregoing embodiments. Those skilled in the art will appreciate that the invention may be embodied in different forms without changing the spirit or essential features of the invention. Therefore, it should be noted that the embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A method for recommending software process improvement using at least one processor, the method comprising:

generating improvement packages from correlated findings by analyzing correlations between findings identified from different processes, the improvement packages generated by at least:

receiving findings identified by process assessment;

calculating correlation weights for the findings by determining input and output between the findings using a symmetrical matrix having the findings in rows and columns; and grouping a predetermined number of findings into the improvement packages in a descending order of the correlation weights;

refining the improvement packages by performing an additional correlation analysis on the improvement packages from at least one of an organizational view, a software life cycle view, an assessment model view, and a business value view; and providing an action plan for process improvement by building recommendations from the refined improvement packages.

2. The method according to claim 1, wherein the grouping comprises grouping the identified correlated findings to comprise many findings and many process areas in each of the improvement packages and to minimize redundancy between the improvement packages.

3. The method according to claim 1, wherein if the additional correlation analysis is performed from the organizational view, the refinement of the improvement packages comprises amending the improvement packages or findings of the improvement packages by calculating correlations between resources preserved in an organization performing the software process improvement and the findings using a matrix having the resources in rows and the findings in columns.

4. The method according to claim 1, wherein if the additional correlation analysis is performed from the software life cycle view, the refinement of the improvement packages comprises amending the improvement packages or findings of the improvement packages by calculating correlations between software life cycles and the findings using a matrix having the life cycles in rows and the findings in columns, taking into account temporal correlations on the software life cycles.

5. The method according to claim 1, wherein if the additional correlation analysis is performed from the assessment model view, the refinement of the improvement packages comprises amending the improvement packages or findings of the improvement packages by calculating correlations between process assessment models used in an organization performing the software process improvement and the findings using a matrix having the assessment models in rows and the findings in columns, taking into account the limitations of the process assessment models.

6. The method according to claim 1, wherein if the additional correlation analysis is performed from the business value view, the refinement of the improvement packages comprises amending the improvement packages or findings of the improvement packages by calculating correlations between business priority levels and the findings using a matrix having the business priority levels in rows and the findings in columns to prioritize the improvement packages according to the business priority levels.

7. The method according to claim 1, wherein the provision of the action plan comprises:

identifying an abstract recommendation by receiving abstract information about each of the improvement packages according to predetermined recommendation templates; and building a concrete recommendation by identifying recommendation seeds from findings of an improvement package regarding the identified abstract recommendation.

8. A non-transitory computer program product comprising at least one computer-readable recording medium having computer-executable program code portions stored therein, the computer-executable program code portions comprising code instructions for:

generating improvement packages from correlated findings by analyzing correlations between findings identified from different processes the improvement packages generated by at least:

receiving findings identified by process assessment;

calculating correlation weights for the findings by determining input and output between the findings using a symmetrical matrix having the findings in rows and columns; and grouping a predetermined number of findings into the improvement packages in a descending order of the correlation weights;

refining the improvement packages by performing an additional correlation analysis on the improvement packages from at least one of an organizational view, a software life cycle view, an assessment model view, and a business value view; and providing an action plan for process improvement by building recommendations from the refined improvement packages.

9. An apparatus for recommending software process improvement, the apparatus comprising:

an input unit configured to receive findings identified from different processes by process assessment; and a processing unit comprising at least one processor configured to:

generate improvement packages from correlated findings by analyzing correlations between the received findings;

refine the improvement packages by performing an additional correlation analysis on the improvement packages from at least one of an organizational view, a software life cycle view, an assessment model view, and a business value view;

and provide an action plan for process improvement by building recommendations from the refined improvement packages;

wherein the processing unit calculates correlation weights by determining input and output between the findings using a symmetrical matrix having the received findings in rows and columns, and generates the improvement packages by grouping a predetermined number of findings into the improvement packages in a descending order of the correlation weights.

10. The apparatus according to claim 9, further comprising a model storage configured to store process correlations provided by a reference model and a process correlation model generated based on correlation data empirically collected during a software process improvement procedure, wherein the processing unit analyzes the correlations between the findings by determining input and output between the received findings, referring to the stored process correlation model.

11. The apparatus according to claim 10, wherein the process correlation model is generated based on a first graph and a second graph, the first graph comprising a Process Model Relation (PMR) representing a correlation weight between practices to which findings are mapped in the reference model, and the second graph comprising an Improvement Package Relation (IPR) representing a weight assigned to the number of occurrences of a relation between practices in empirically collected project cases, and wherein a Relation Weight (RW) of the process correlation model is calculated by adding the PMR to the IPR.

12. The apparatus according to claim 10, wherein the processing unit groups the identified correlated findings referring to the process correlation model in a manner that maximizes a correlation weight between findings, maximizes the number of findings in one improvement package, and minimizes redundancy between improvement packages.

13. The apparatus according to claim 9, wherein the processing unit amends the improvement packages or findings of the improvement packages by performing an additional correlation analysis on the improvement packages from at least one of an organizational view, a software life cycle view, an assessment model view, and a business value view.

* * * * *